U. D. MIHILLS.
Improvement in Shingle-Machines.

No. 114,322. Patented May 2, 1871.

Witnesses:
P. C. Dieterich.
Wm. H. C. Smith.

Inventor:
U. D. Mihills.
per Munn & Co.
Attorneys.

UNITED STATES PATENT OFFICE.

URIAH D. MIHILLS, OF FOND DU LAC, WISCONSIN.

IMPROVEMENT IN SHINGLE-MACHINES.

Specification forming part of Letters Patent No. 114,322, dated May 2, 1871.

*To all whom it may concern:*

Be it known that I, URIAH D. MIHILLS, of Fond du Lac, in the county of Fond du Lac and State of Wisconsin, have invented a new and useful Improvement in Shingle-Machine; and I do hereby declare that the following is a full, clear, and exact description thereof, which will enable others skilled in the art to make and use the same, reference being had to the accompanying drawing, forming part of this specification.

This invention relates to new and useful improvements in machines for sawing shingles, designed more especially for cutting up waste lumber and utilizing what usually remains of the shingle-bolts as they are left by other shingle-machines; and it consists in the construction and arrangement of parts hereinafter more fully described.

Figure 1:
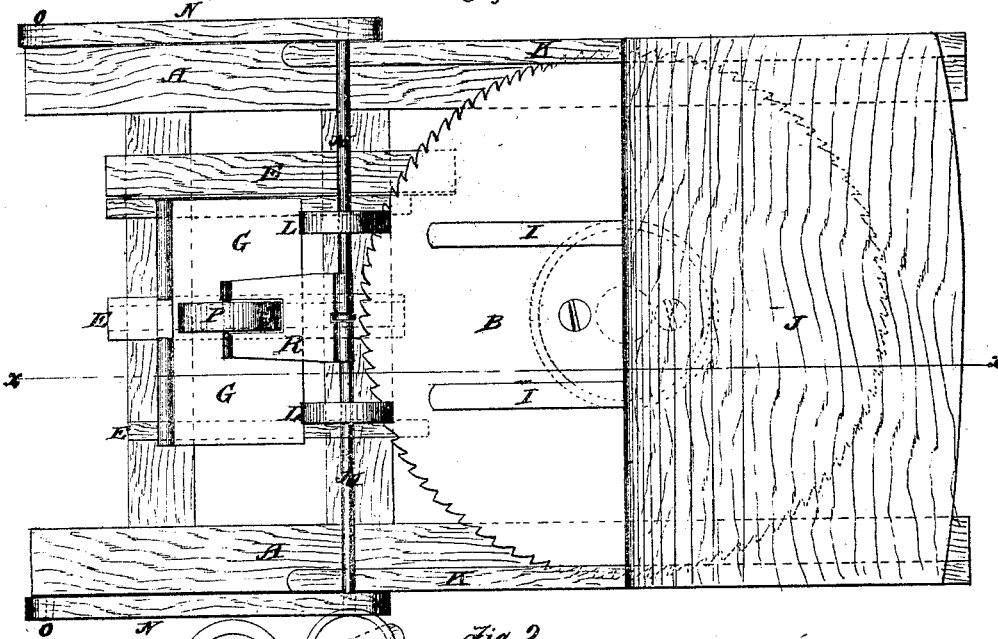
Figure 2:
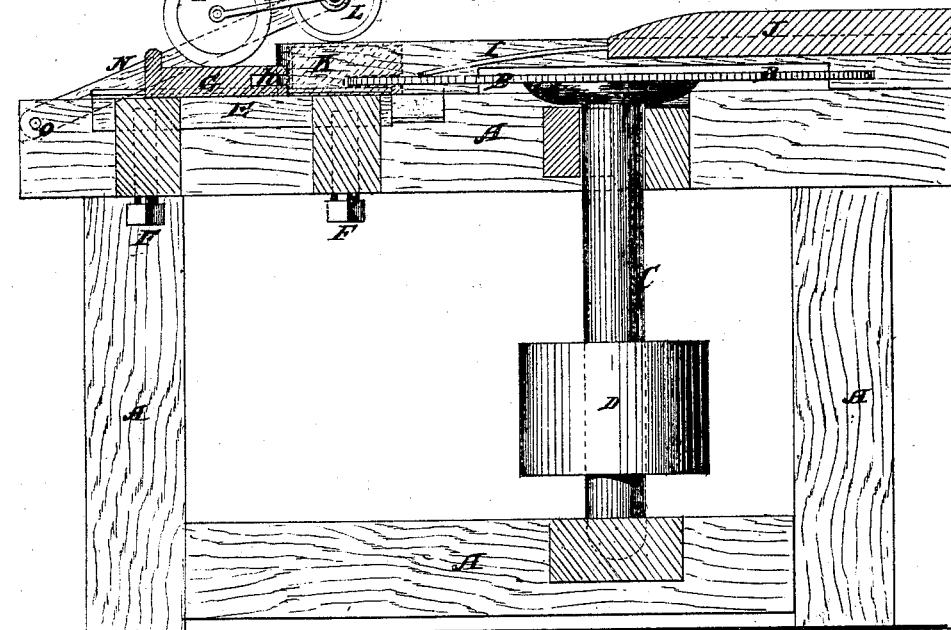
Figure 3:
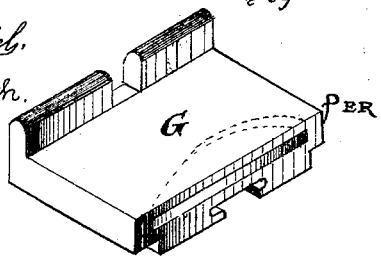

In the accompanying drawing, Figure 1 represents a top or plan view. Fig. 2 is a vertical section of Fig. 1, taken on the line $x\,x$. Fig. 3 is a perspective view of the carriage or slide by which the bolt is moved up to the saw.

Similar letters of reference indicate corresponding parts.

A is the frame, which is made of wood, and of suitable size and strength. B is the saw, which is made to revolve horizontally on the vertical shaft C. D is a pulley on the shaft C, which receives a belt from the motive power. E represents ways, which are made adjustable as to height by means of the set-screws F. The block or bolt to be sawed is placed upon these ways, and their height with regard to the saw regulates the thickness of the shingle, which is sawed from the under side of the bolt.

G is a carriage, which slides back and forth on the ways E, worked by hand, by which the bolt is forced up to the saw. There is a slot, $h$, in the front edge of the carriage or slide G for the saw to enter, so that the shingle is cut entirely from the bolt.

I I are guides, which receive the bolt and keep it from the saw as the shingle is cut. These guides are supported from the shield J, which covers the rear portion of the saw.

K represents the bolt (see Fig. 2) as the shingle is being sawed from it. L L are rollers on the horizontal shaft M, which bear upon the bolt by their own gravity and keep it down to its place on the ways. The shaft M revolves in the swinging arms N N, which are pivoted to the frame at the points O O.

P is a roller, which is supported from the shaft M by the plate R, and may bear upon the carriage or slide G, or be thrown over so as to bear upon the bolt as the latter passes up onto the guides I I.

The left-hand way E projects upward, so as to form a shoulder for the butt-end of the shingle to rest against to resist the action of the saw, which would otherwise force the bolt endwise.

With this machine the remnants of bolts from other machines, or pieces of boards or any waste pieces of lumber, may be utilized and sawed into shingles, if there be thickness or material enough to make a shingle.

Having thus described my invention, I claim as new and desire to secure by Letters Patent—

In combination with the saw B and frame A, the adjustable ways E, carriage or slide K, rollers L L and R, guides I I, and shield J, when the same are constructed and arranged to operate as herein shown and described, for the purposes set forth.

URIAH D. MIHILLS.

Witnesses:
P. A. JOHNSON,
P. M. BAKER.